United States Patent
Cooper

(10) Patent No.: US 9,551,384 B2
(45) Date of Patent: Jan. 24, 2017

(54) CLUTCH MANAGEMENT SYSTEM

(71) Applicant: DANA AUTOMOTIVE SYSTEMS GROUP, LLC, Maumee, OH (US)

(72) Inventor: Kenneth E. Cooper, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 65 days.

(21) Appl. No.: 14/735,327

(22) Filed: Jun. 10, 2015

(65) Prior Publication Data
US 2015/0275986 A1 Oct. 1, 2015

Related U.S. Application Data

(62) Division of application No. 14/071,793, filed on Nov. 5, 2013, now Pat. No. 9,121,455.

(51) Int. Cl.
| | |
|---|---|
| *F16D 13/54* | (2006.01) |
| *F16D 23/12* | (2006.01) |
| *F16D 28/00* | (2006.01) |
| *F16D 13/52* | (2006.01) |
| *F16H 3/44* | (2006.01) |

(52) U.S. Cl.
CPC .............. *F16D 23/12* (2013.01); *F16D 13/52* (2013.01); *F16D 13/54* (2013.01); *F16D 28/00* (2013.01); *F16D 2023/123* (2013.01); *F16H 2003/442* (2013.01); *F16H 2003/445* (2013.01); *F16H 2200/2007* (2013.01); *F16H 2200/2097* (2013.01)

(58) Field of Classification Search
CPC .......... F16D 28/00; F16D 23/12; F16D 13/54; F16D 2023/123; F16H 2003/445; F16H 2003/442; F16H 2200/2007; F16H 2200/2097

USPC ........... 475/296; 74/333; 192/84.6, 84.7, 20
See application file for complete search history.

(56) References Cited

U.S. PATENT DOCUMENTS

| | | |
|---|---|---|
| 5,964,330 A | 10/1999 | Organek et al. |
| 6,464,608 B2 | 10/2002 | Bowen et al. |
| 6,491,140 B2 | 12/2002 | Usui et al. |

(Continued)

FOREIGN PATENT DOCUMENTS

| | | |
|---|---|---|
| DE | 4140122 A1 | 6/1993 |
| DE | 102010037317 A1 | 3/2012 |

(Continued)

OTHER PUBLICATIONS

International Search Report for Application No. PCT/US2013/068418 dated Jul. 30, 2014.

*Primary Examiner* — Roger Pang
(74) *Attorney, Agent, or Firm* — Marshall & Melhorn, LLC

(57) ABSTRACT

A clutch management system has a ramp actuator, an inner plate housing, an outer plate housing, and a clutch assembly. The clutch assembly may have a motor, a ratio adaptor, a primary sun gear, a secondary sun gear, a primary planet carrier and a secondary planet carrier. The primary sun gear is in contact with the ratio adaptor and primary planet gears. The primary planet gears are in contact with a ring gear. The primary planet carrier forms part of the ramp actuator. The second sun gear is connected to a housing and a secondary planet gears. The secondary planet gears are also in contact with the ring gear. A secondary planet carrier is connected to the first plate of the ramp actuator.

9 Claims, 4 Drawing Sheets

(56) References Cited

U.S. PATENT DOCUMENTS

| | | |
|---|---|---|
| 6,966,864 B2 | 11/2005 | Williams et al. |
| 7,216,751 B2 | 5/2007 | Teraoka |
| 7,255,186 B2 | 8/2007 | Wakuta et al. |
| 7,354,374 B2 | 4/2008 | Teraoka |
| 7,798,938 B2 | 9/2010 | Matsubara et al. |
| 8,332,110 B2 | 12/2012 | Vogel et al. |
| 8,382,630 B2 | 2/2013 | Brinks et al. |
| 9,121,455 B2 * | 9/2015 | Cooper .................. F16D 13/54 |
| 2004/0051320 A1 | 3/2004 | Woernle |
| 2004/0116230 A1 * | 6/2004 | Hakui ................ F16H 63/3043 |
| | | 475/149 |
| 2005/0197228 A1 | 9/2005 | Showalter |
| 2008/0300108 A1 | 12/2008 | Eybergen et al. |
| 2009/0098970 A1 | 4/2009 | Kimes |
| 2012/0100957 A1 | 4/2012 | Reitz |
| 2012/0136518 A1 | 5/2012 | Samie et al. |
| 2012/0217114 A1 | 8/2012 | Ari et al. |

FOREIGN PATENT DOCUMENTS

| | | | |
|---|---|---|---|
| EP | 0848178 A2 * | 6/1998 | ............. F16D 13/04 |
| WO | WO02066851 A1 | 8/2002 | |

\* cited by examiner

US 9,551,384 B2

CLUTCH MANAGEMENT SYSTEM

RELATED APPLICATIONS

This application claims priority to and the benefit of U.S. Patent Application Ser. No. 61/723,699 filed on Nov. 7, 2012, which is fully incorporated by reference herein. This application is a divisional of U.S. patent application Ser. No. 14/071,793 filed on Nov. 5, 2013, which is fully incorporated by reference herein.

BACKGROUND OF THE INVENTION

Improved fuel economy in vehicles is typically always desirable. There are many ways improved fuel economy might be accomplished and one is by making the driveline more efficient.

In addition, improved controllability of the vehicle is also desirable. Improved controllability can be accomplished, for example, by managing the torque in the driveline that gets distributed to the wheels.

Both improved fuel economy and improved controllability can be achieved by a rapid disconnect and reconnect system(s) in the driveline. By disconnecting portions of the driveline that are not needed, spinning and driving losses are minimized, thus improving fuel economy. When the portions are needed, they can be rapidly engaged to distribute torque to individual wheels for as long as needed.

Known prior art systems failed to provide a cost effective solution for improving controllability without adding increased weight or complexity, which resulted in decreased fuel economy. It would be desirable for a system to improve controllability of a vehicle, while also resulting in improved fuel economy.

SUMMARY OF THE INVENTION

One embodiment of a clutch management system comprises a ramp actuator having a first plate and a second plate. The plates may be connected together by at least one ball bearing located between the plates. The system may also have an inner plate housing and an outer plate housing. The inner plate housing is selectively connected to the outer plate housing by a plurality of interleaved plates. The system may also have a clutch assembly comprising a motor, a ratio adaptor, a primary sun gear, a secondary sun gear, a primary planet carrier, and a secondary planet carrier.

The primary sun gear has a first end in direct contact with the ratio adaptor and a second end in direct contact with a plurality of primary planet gears located on a first end of the primary planet carrier. The plurality of primary planet gears are in direct contact with a ring gear. The primary planet carrier has a second end that connects with the outer plate housing.

The secondary sun gear has a first end mounted to a housing and a second end in direct contact with a plurality of secondary planet gears located on a first end of a secondary planet carrier. The plurality of secondary planet gears is in direct contact with the ring gear. The secondary planet carrier has a second end connected to the first plate of the ramp actuator.

BRIEF DESCRIPTION OF THE DRAWINGS

The advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
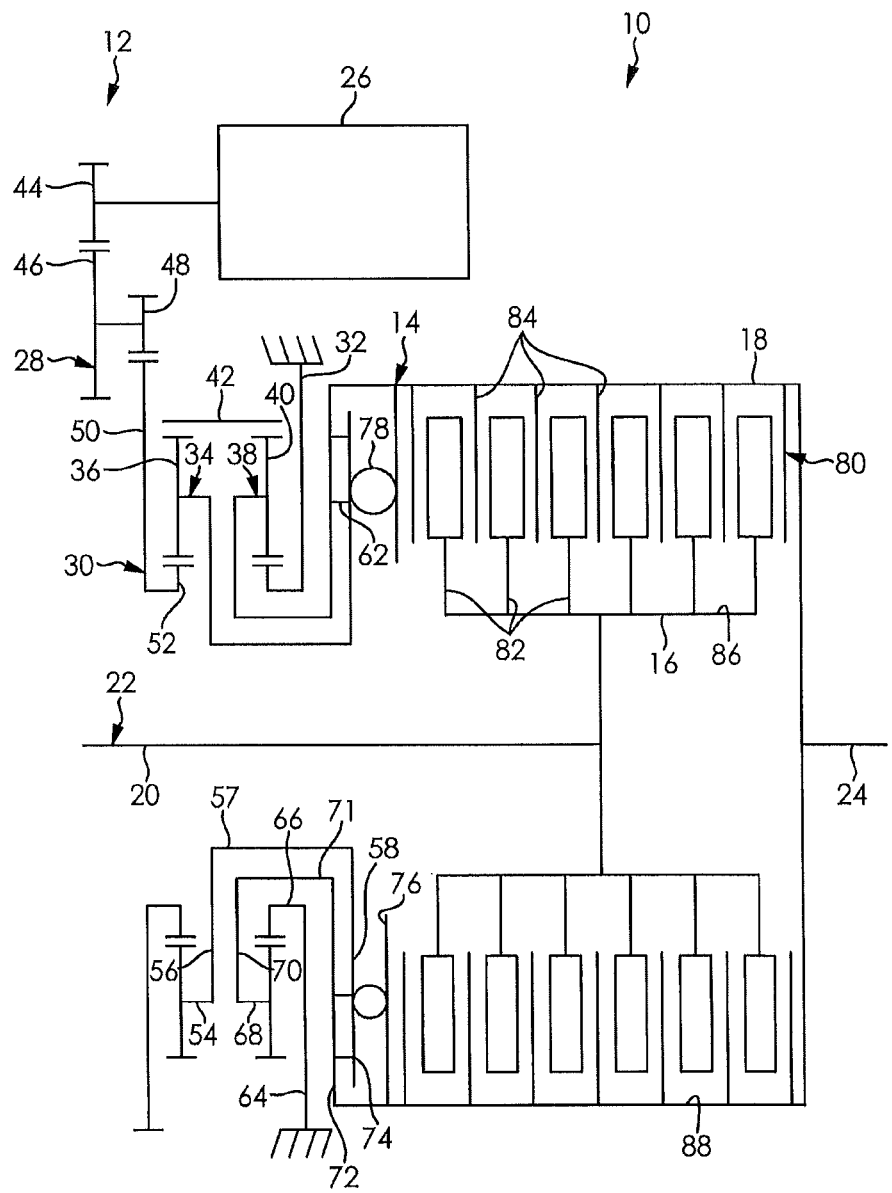
FIG. 1 is a schematic view of an electric actuator for a clutch management system.

FIG. 1 illustrates a clutch management assembly 10 including an electric clutch assembly 12 according to an embodiment of the invention. The clutch management assembly 10 preferably comprises the electric clutch assembly 12, a ramp actuator 14, an inner plate housing 16, and an outer plate housing 18. As shown, an outboard portion 20 of a drive axle 22 is in driving engagement with the inner plate housing 16 and an inboard portion 24 of the drive axle 22 is in driving engagement with the outer plate housing 18; however, it is understood that the orientation of the inner plate housing 16 and the outer plate housing 18 may be reversed with respect to the outboard portion 20 and the inboard portion 24. The clutch management assembly 10 is typically disposed in a housing (not shown) coupled to an axle housing (not shown) or another rigid portion of a vehicle the clutch management assembly 10 is incorporated in.

The electric clutch assembly 12 is disposed about the outboard portion 20 and is drivingly engaged with the outer plate housing 18 and a portion of the ramp actuator 14. The electric clutch assembly 12 includes a motor 26, a ratio adapter 28, a primary sun gear 30, a secondary sun gear 32, a primary planet carrier 34 including a plurality of primary planet gears 36 rotatably disposed thereon, a secondary planet carrier 38 including a plurality of secondary planet gears 40 rotatably disposed thereon, and a common ring gear 42. The electric clutch assembly 12 facilitates driving engagement and variable driving engagement between the outer plate housing 18 and the inner plate housing 16.

The motor 26 is a reversible electric motor disposed adjacent to drivingly engaged with the ratio adapter 28. However, it is understood that the motor 26 may be any other kind of motor. The motor 26 is in electrical communication with a controller (not shown), which is used to control a rotational speed or a rotational position of the motor 26. The motor 26 is coupled to an output gear 44 of the motor 26 applies a rotational force to the ratio adapter 28. The motor is attached to the housing that encloses the assembly 12. Alternately, the motor 26 may be coupled to another rigid portion of the vehicle.

The ratio adapter 28 is a shaft rotatably disposed within the housing. The ratio adapter 28 has a first end 46 and a second end 48. The first end 46 and the second end 48 each form respective gears. The first end 46 is drivingly engaged with the output gear 44 and has a diameter greater than the second end 48; but it is understood that the first end 46 may have any size with respect to the second end 48, depending on an operating characteristic of the motor 26. It is also understood that the operating characteristic of the motor 26 may permit the ratio adapter 28 to be eliminated from the electric clutch assembly 12. The second end 48 is drivingly engaged with the primary sun gear 30. As shown in FIG. 1, the ratio adapter 28, because of the second end gear size with respect to the first end gear size, as well as a predetermined number of teeth on the ends 46, 48, is configured to reduce an output speed of the motor 26.

The primary sun gear 30 is an annular member rotatably disposed about the outboard portion 20, within the housing. The primary sun gear 30 has a first end 50 and a second end 52. The first end 50 and the second end 52 each form respective gears. The first end 50 is drivingly engaged with the second end 48 of the ratio adapter 28 and has a diameter greater than the second end 52. The second end 52 is drivingly engaged with each of the primary planet gears 36 rotatably disposed on the primary planet carrier 34.

Each of the primary planet gears 36 is rotatably disposed on a pinion support 54 extending from the primary planet carrier 34. As a non-limiting example, the plurality of primary planet gears 36 may comprise at least three primary planet gears 36; however, it is understood that the plurality of primary planet gears 36 may comprise other quantities. Each of the primary planet gears 36 have gear teeth formed on an outer surface thereof, which are drivingly engaged with the second end 52 of the primary sun gear 30. Preferably, bearings (not shown) are disposed between each of the primary planet gears 36 and the pinion supports 54, however, the primary planet gears 36 may be directly mounted on the pinion supports 54.

The primary planet carrier 34 is an annular member rotatably disposed about the outboard portion 20, within the housing. The primary planet carrier 34 has a first end 56 and a second end 58. The first end 56 and the second end 58 each extend radially outwardly from an intermediate portion 57 of the primary planet carrier 34.

The first end 56 includes a plurality of the pinion supports 54 extending therefrom, onto which the primary planet gears 36 are rotatably disposed. A quantity of the plurality of the pinion supports 54 corresponds to the quantity of the primary planet gears 36. The first end 56 extends radially outward from the primary planet carrier 34.

The second end 58 extends radially outwardly from the primary planet carrier 34 and is drivingly engaged with a portion of the ramp actuator 14. The second end 58 is disposed adjacent a portion of the secondary planet carrier 38, and a bearing 62 is disposed therebetween. As a non-limiting example, the bearing 62 is a thrust needle bearing; but it is understood that other bearing types may be used.

The secondary sun gear 32 is an annular, substantially disc shaped body fixed within the housing, about the outboard portion 20. The secondary sun gear 32 has a mounting end 64 and an engagement end 66. The mounting end 64 is coupled to the housing in any conventional manner. Alternately, it is understood that the secondary sun gear 32 including the mounting end 64 may be integrally formed with the housing. The engagement end 66 is radially inward from the mounting end 64 and forms a gear. The engagement end 66 is drivingly engaged with each of the secondary planet gears 40 rotatably disposed on the secondary planet carrier 38.

Each of the secondary planet gears 40 is rotatably disposed on a pinion support 68 extending from the secondary planet carrier 38. As a non-limiting example, the plurality of secondary planet gears 40 may comprise at least three secondary planet gears 40; however, it is understood that the plurality of secondary planet gears 40 may comprise other quantities. Each of the secondary planet gears 40 have gear teeth formed on an outer surface thereof, which are drivingly engaged with the engagement end 66 of the secondary sun gear 32. Preferably, bearings are disposed between each of the secondary planet gears 40 and the pinion supports 68, however, the secondary planet gears 40 may be directly mounted on the pinion supports 68.

The secondary planet carrier 38 is an annular member rotatably disposed about the outboard portion 20, within the housing. The secondary planet carrier 38 has a first end 70 and a second end 72. The first end 70 and the second end 72 each extend radially outwardly from an intermediate portion 71 of the secondary planet carrier 38.

The first end 70 includes a plurality of the pinion supports 68 extending therefrom, onto which the secondary planet gears 40 are rotatably disposed. A quantity of the plurality of the pinion supports 68 corresponds to the quantity of the secondary planet gears 40.

The second end 72 extends radially outwardly from the secondary planet carrier 38 and is drivingly engaged with the outer plate housing 18. The second end 72 is coupled to the outer plate housing in any conventional manner, such as through a plurality of fasteners or a weld, for example. The second end 72 is disposed adjacent the second end 58 of the primary planet carrier 38, as described hereinabove. More particularly, the two second ends 58, 72 extend radially outward from the drive axle outboard portion 20 in a parallel fashion to one another.

The common ring gear 42 is an annular member rotatably disposed about the outboard portion 20, within the housing. The common ring gear 42 has a plurality of gear teeth formed on an inner surface thereof, which is drivingly engaged with the plurality of primary planet gears 36 and the plurality of secondary planet gears 40. Bearings (not shown) are disposed between the common ring gear 42 and the housing to facilitate rotation therebetween. The primary sun gear 30, the plurality of primary planet gears 36, and the common ring gear 42 form a first epicyclic gear set. The secondary sun gear 32, the plurality of secondary planet gears 40, and the common ring gear 42 form a second epicyclic gear set. As shown in FIG. 1 and described hereinabove, the first epicyclic gear set is linked to the second epicyclic gear set through the common ring gear 42.

The ramp actuator 14 comprises a first plate 74, a second plate 76, and a plurality of actuation elements 78. The ramp actuator 14 is a ball and ramp style linear actuator and is known in the art; however, it is understood that other types of actuators may be used. When the first plate 74 and the second plate 76 are rotated with respect to one another, the first plate 74 and the second plate 76 become spaced apart and are used to apply a linear force to a clutch pack 80.

The first plate 74 is a disk shaped member having a plurality of arc-shaped ramps formed therein and oriented to face the second plate 76. A depth of each of the arc-shaped ramps varies along a length of each of the arc-shaped ramps. A quantity of the ramps corresponds to a number of actuation elements 78 comprising the plurality of spherical elements. The first plate 74 is coupled to the second end 58 of the primary planet carrier 34.

The second plate 76 is a disk shaped member having a plurality of arc-shaped ramps formed therein and oriented to face the first plate 74. A depth of each of the arc-shaped ramps varies along a length of each of the arc-shaped ramps. A quantity of the ramps corresponds to a number of actuation elements 78 comprising the plurality of spherical elements. The second plate 74 is in driving engagement with the outer plate housing 18; however, the second plate 74 may be moved along an axis of the outer plate housing 18 while maintaining driving engagement therewith. The second plate 76 is disposed against the clutch pack 80, which comprises a plurality of inner plates 82 interleaved with a plurality of outer plates 84. It is understood that a plurality of biasing members (not shown) may also be interleaved between the plurality of inner plates 82 and the plurality of outer plates 84 to ensure the plates 82, 84 are spaced apart in a substantially equidistant manner and to militate against losses caused by unnecessary contact between the plates 82, 84 when the clutch pack 80 is uncompressed.

The plurality of inner plates 82 and the plurality of outer plates 84 are conventional friction style clutch plates, and are well known in the art. Alternately, it is understood that the clutch management assembly 10 may be adapted for use with other clutch types.

The actuation elements 78 are ball bearings rotatably disposed in the arc-shaped ramps formed in the first plate 74 and the second plate 76. Alternately, it is understood that the actuation elements 78 may have other shapes. When the first plate 74 and the second plate 76 are rotated with respect to one another, the actuation elements 78 roll within the arc-shaped ramps formed in the first plate 74 and the second plate 76, which cause the first plate 74 and the second plate 76 to become spaced apart based on a depth of the arc-shaped ramps.

The inner plate housing 16 is in driving engagement with the outboard portion 20 of the drive axle 22. The inner plate housing 16 is a hollow cylindrical member coupled to a distal end of the outboard portion 20 of the drive axle 22 in any conventional manner. The inner plate housing 16 is disposed within the housing of the clutch management assembly 10. A plurality of axial grooves (not shown) is formed in an outer surface 86 of the inner plate housing 16. The plurality of inner plates 82 are drivingly engaged with the axial grooves of the inner plate housing 16; however, the inner plates 82 may be moved along an axis of the inner plate housing 16 while maintaining driving engagement therewith.

The outer plate housing 18 is in driving engagement with the inboard portion 24 of the drive axle 22. The outer plate housing 18 is a hollow cylindrical member coupled to a distal end of the inboard portion 24 of the drive axle 22 in any conventional manner. The outer plate housing 18 is disposed within the housing of the clutch management assembly 10. A plurality of axial grooves (not shown) is formed in an inner surface 88 of the outer plate housing 18. The plurality of outer plates 84 are drivingly engaged with the axial grooves of the outer plate housing 18; however, the outer plates 84 may be moved along an axis of the outer plate housing 18 while maintaining driving engagement therewith.

In use, the clutch management assembly 10 facilitates driving engagement and variable driving engagement between the inboard portion 24 and the outboard portion 20 of the drive axle 22. When the inboard portion 24 is disengaged from the outboard portion 20, the primary sun gear 30, the secondary sun gear 32, the primary planet carrier 34, the plurality of primary planet gears 36, the secondary planet carrier 38, the plurality of secondary planet gears 40, the common ring gear 42, the ramp actuator 14, the outer plate housing 18, and the plurality of outer plates 84 are substantially stationary.

To switch the clutch management assembly 10 from a disengaged condition to an engaged condition, the controller activates the motor 26, driving the output gear 44. In response to the movement of the output gear 44, the ratio adapter 28 and the primary sun gear 30 rotate, driving the primary planet carrier 34 through the plurality of primary planet gears 36. When the primary planet carrier 34 is driven, the first plate 74 of the ramp actuator 14 is also driven. When a rotational force is applied to the first plate 74 of the ramp actuator 14, the first plate 74 rotates at a faster rate than the second plate 76 and the actuating elements 78 in the arc-shaped ramps formed in the first plate 74 and the second plate 76 drive the second plate 76 away from the first plate 74, compressing the clutch pack 80. In response to the clutch pack 80 being compressed, the inboard portion 24 becomes drivingly engaged with the outboard portion 20, and the primary planet carrier 34 and the secondary planet carrier 38 are respectively driven by the compression of the clutch pack 80 and the outer plate housing 18.

When the ramp actuator 14 is placed in a fully engaged position, the primary planet carrier 34 and the secondary planet carrier 38 rotate at the same speed. As a result of the first epicyclic gear set being linked to the second epicyclic gear set through the common ring gear 42 and the secondary sun gear 32 being fixed, the primary sun gear 32 is not back driven by the primary planet gears 36 through the primary planet carrier 34. Such an arrangement permits the motor to disengage the ramp actuator 14 despite rotation of the ramp actuator 14 by driving the primary sun gear 30, which rotates the first plate 74 of the ramp actuator 14 with respect to the second plate 76, allowing the clutch pack 80 to decompress.

Figure 2:
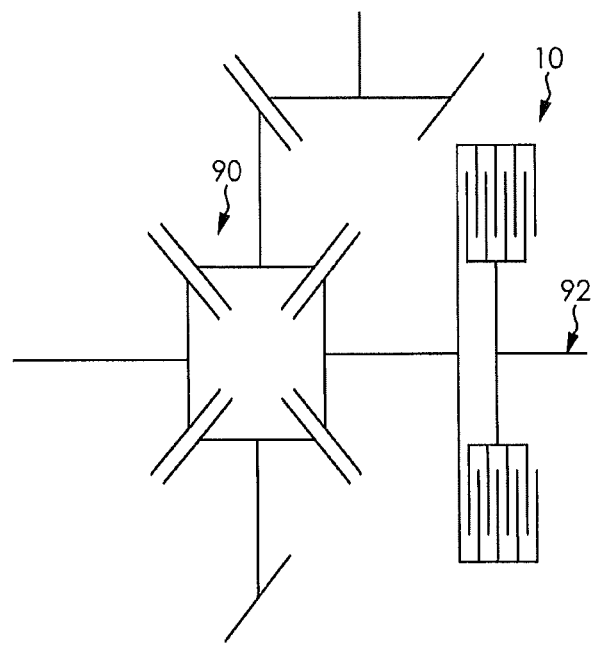
FIG. 2 is a schematic view of a clutch management assembly connected to a differential.
Figure 3:
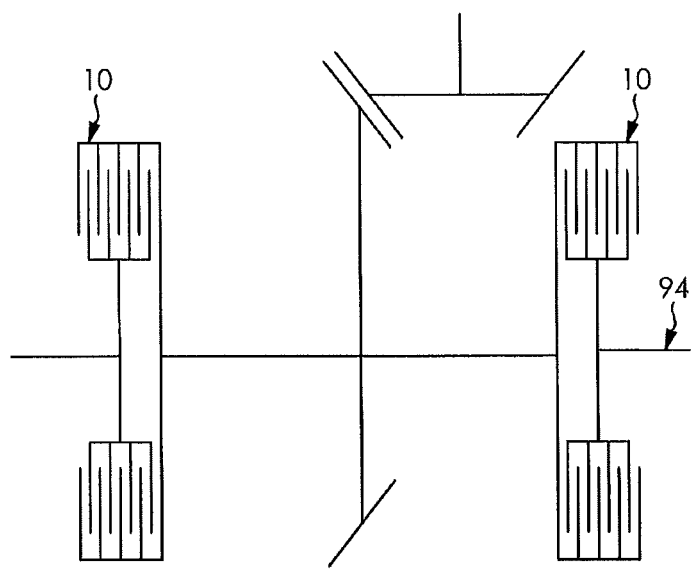
FIG. 3 is a schematic view of two clutch management assemblies connected to a ring gear.
Figure 4:
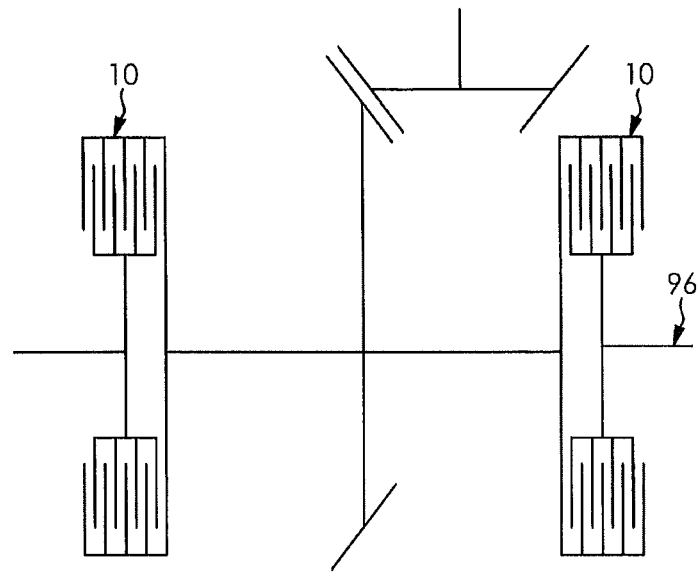
FIG. 4 is a schematic view of two clutch management assemblies connected to another ring gear.

By sensing a position of the motor 26 using the controller, a level of variable engagement of the clutch management assembly 10, and thus an amount of torque transferred from the outer plate housing 18 to the inner plate housing 16, can be determined. FIGS. 2-4 illustrate various applications the clutch management assembly 10 may be employed in, each of which is described below.

FIG. 2 illustrates the clutch management assembly 10 paired with an axle differential 90. The clutch management assembly 10 may be used as an axle disconnect device. When engaged, the clutch management assembly 10 facilitates driving engagement of a secondary axle 92 of a vehicle, for example. The clutch management assembly 10 may also be used as a torque managing device. When variably engaged, the clutch management assembly 10 applies an amount of torque from a vehicle driveline to the secondary axle 92 of the vehicle, which is balanced between the wheels (not shown) of the vehicle by the axle differential 90.

FIG. 3 illustrates a secondary axle 94 equipped with two clutch management assemblies 10. In this application, a need for an axle differential is eliminated, as through control of the clutch management assemblies 10, any differential function needed can be provided, in addition to the axle disconnect function and the axle torque managing functions described above. Further, the clutch management assemblies 10 can control torque distribution between the wheels of the secondary axle 94. Such a function can adjust a torque balance between the wheels during a turn of the vehicle, for example.

FIG. 4 illustrates a secondary axle 96 equipped with two clutch management assemblies 10. The secondary axle 96 is provided with of an overspeed ratio. As a non-limiting example, the overspeed ratio may be about 5%, but it is understood that other ratios may be used. In this application, a need for an axle differential is eliminated, as through control of the clutch management assemblies 10, any differential function needed can be provided, in addition to the axle disconnect function and the axle torque managing functions described above. Further, the clutch management assemblies 10 can control torque distribution between the wheels of the secondary axle 96. Such a function can adjust a torque balance between the wheels during a turn of the vehicle, for example. The overspeed ratio, when paired with the clutch management assemblies 10 allows a greater amount of torque to be applied to the secondary axle 96 of the vehicle when desired, when compared to the application illustrated in FIG. 3. The overspeed ratio also allows one of the wheels of the secondary axle 96 to be driven in an overspeed condition, which facilitates greater control of the torque distribution between the wheels. Such a function is particularly useful for increasing the amount of torque applied to an outer wheel during a turn of the vehicle, for example.

Figure 5:
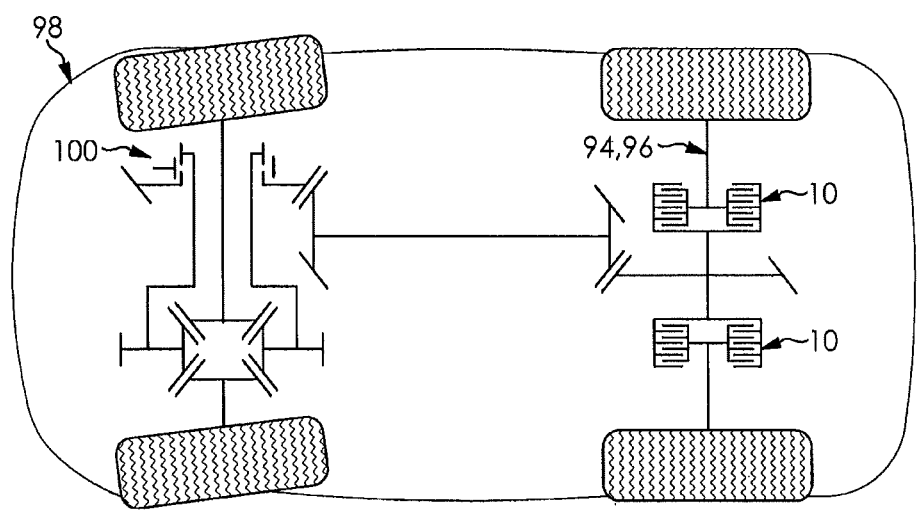
FIG. 5 is a schematic view of one embodiment of two clutch management assemblies as laid out in a vehicle.

FIG. 5 illustrates a drivetrain layout for a vehicle 98 including the clutch management assemblies 10. The drivetrain layout may be applied to the applications described above and shown in FIGS. 3 and 4. It is understood that the applications described above and shown in FIG. 2 may be adapted for use with the drivetrain layout. As shown, the vehicle 98 includes an axle disconnect device 100 positioned about a front axle of the vehicle 98. The axle disconnect device 100 cooperates with the clutch management assemblies 10 to engage the secondary axle 94, 96. When single axle operation of the vehicle is desired, it is understood that the axle disconnect device 100 and the clutch management assemblies 10 are placed in the disengaged positions to reduce an amount of drivetrain windage.

Figure 6:
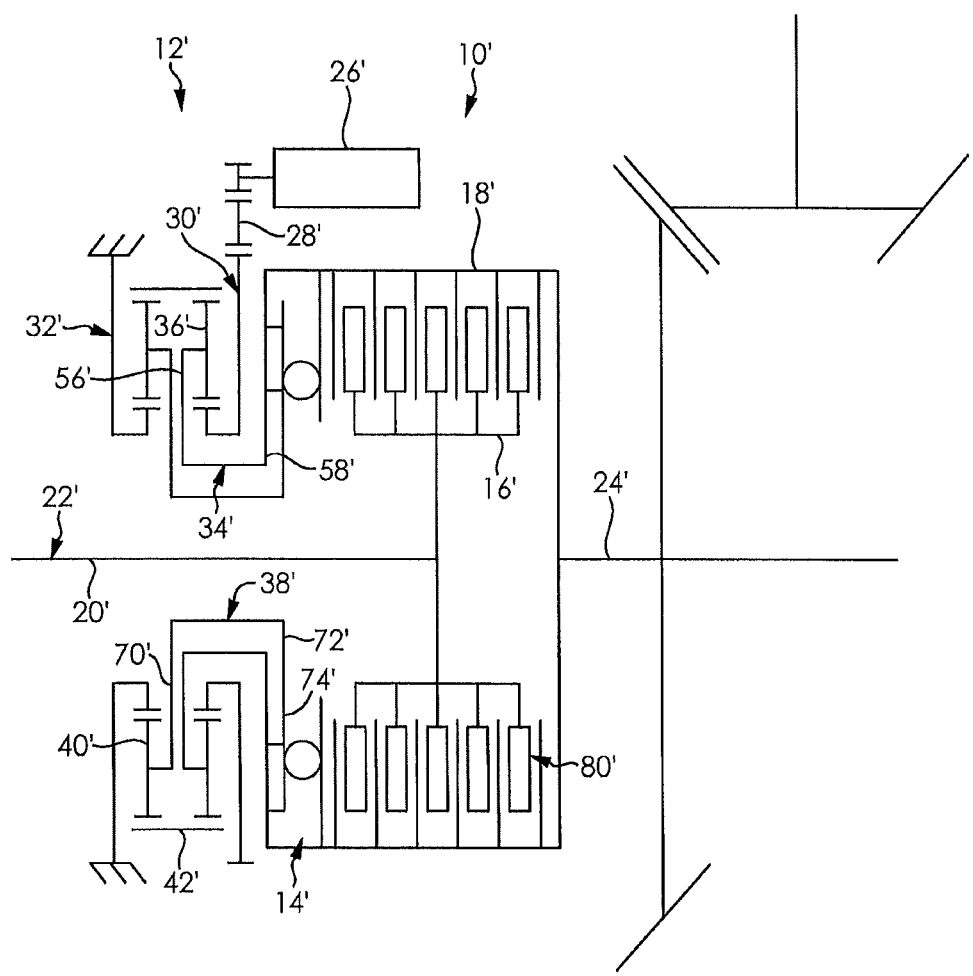
FIG. 6 depicted an alternative embodiment of a clutch management system.

FIG. 6 shows an alternative embodiment of the clutch management assembly 10. Similar structural features of the clutch management assembly 10 include the same reference numeral and a prime (') symbol. A clutch management assembly 10' shown in FIG. 6 includes a primary planet carrier 34' which is drivingly engaged with an outer plate housing 18' and a secondary planet carrier 38' which is drivingly engaged with a portion of a ramp actuator 14'.

More particularly, the primary planet carrier 34' has a first end 56' and a second end 58'. The first end 56' carries a plurality of planet gears 36' thereon and the second end 58' connects with the outer plate housing 18'. The planet gears 36' are meshed with the ring gear 42' and the primary sun gear 30'. The primary sun gear 30' is connected to the ratio adaptor 28', which is connected to the motor 26'.

The secondary planet carrier 38' has a first end 70' and a second end 72'. The first end 70' carries a plurality of planet gears 40' thereon. The planet gears 40' are meshed with the ring gear 42' and the secondary sun gear 32'. The secondary sun gear 32' is coupled to the housing in any conventional manner. The second end 72' of the carrier 38' is coupled to the first plate 74'.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A clutch management system, comprising:
   a ramp actuator having a first plate and a second plate, said plates connected together by at least one ball bearing located between said plates;
   an inner plate housing;
   an outer plate housing, said inner plate housing selectively connected to said outer plate housing by a plurality of interleaved plates;
   a clutch assembly comprising a motor, a ratio adaptor, a primary sun gear, a secondary sun gear, a primary planet carrier, and a secondary planet carrier,
   wherein said primary sun gear has a first end in direct contact with said ratio adaptor and a second end in direct contact with a plurality of primary planet gears located on a first end of said primary planet carrier, said plurality of primary planet gears being in direct contact with a ring gear, said primary planet carrier having a second end that connects with said outer plate housing,
   wherein said secondary sun gear has a first end mounted to a housing and a second end in direct contact with a plurality of secondary planet gears located on a first end of a secondary planet carrier, said plurality of secondary planet gears being in direct contact with said ring gear, said secondary planet carrier having a second end connected to said first plate of said ramp actuator.

2. The clutch management system of claim 1, wherein said inner plate housing is connected to an outboard portion of a drive axle and said outer plate housing is connected to an inboard portion of said drive axle.

3. The clutch management system of claim 1, wherein a motor is connected to an output gear that is drivingly engaged with said ratio adaptor.

4. The clutch management system of claim 2, wherein said primary planet carrier is an annular member rotatably disposed about said outboard portion, said primary planet carrier having a first end, a second end and an intermediate portion connecting said two ends, wherein said two ends extend radially from said primary planet carrier.

5. The clutch management system of claim 2, wherein said secondary planet carrier is an annular member rotatably disposed about said outboard portion, said secondary planet carrier having a first end, a second end and an intermediate portion connecting said two ends, wherein said two ends extend radially from said secondary planet carrier.

6. The clutch management system of claim 1, wherein said primary sun gear, said plurality of primary planet gears and said ring gear form a first epicyclic gear set.

7. The clutch management system of claim 6, wherein said secondary sun gear, said plurality of secondary planet gears and said ring gear form a second epicyclic gear set.

8. The clutch management system of claim 7, wherein said first epicyclic gear set is linked to said second epicyclic gear set through said ring gear.

9. The clutch management system of claim 2, wherein said outer plate housing is connected to said inboard portion of said drive axle, said inboard portion of said drive axle is directly connected to a side gear of a differential, said side gear connected to at least one pinion gear.

* * * * *